E. DARNELL.
Preserving Process.
No. 63,484.
Patented Apr. 2, 1867.
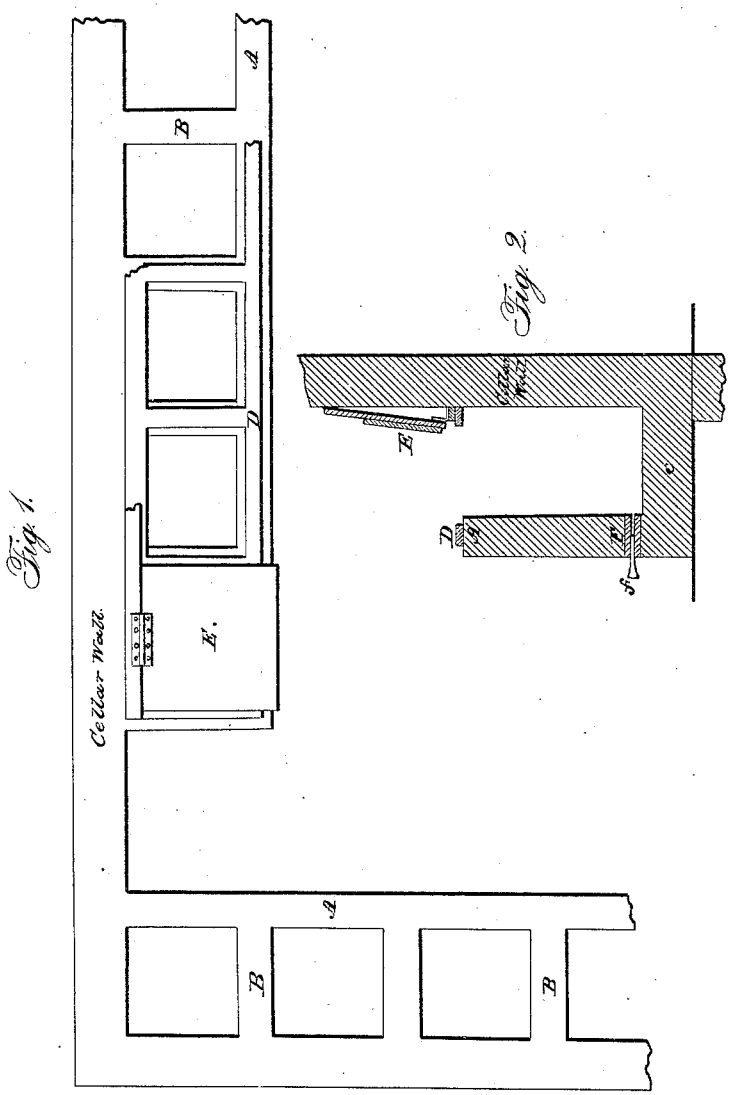
Witnesses:
J. B. Turchin
H. C. Rorie
Inventor:
Enoch Darnell

United States Patent Office.

ENOCH DARNELL, OF FOX, ILLINOIS.

Letters Patent No. 63,484, dated April 2, 1867.

---

IMPROVEMENT IN SALTING AND PRESERVING MEATS AND OTHER MATERIALS.

---

The Schedule referred to in these Letters Patent and making part of the same.

---

TO ALL WHOM IT MAY CONCERN:

Be it known that I, ENOCH DARNELL, of the town of Fox, in the county of Kendall, State of Illinois, have invented new and useful improvements in Salting and Preserving Meat or other Substances; and I do hereby declare that the following is a full and exact description thereof, reference being had to the accompanying drawings, making part of this specification.

The object of my invention is to produce for house and shop-keepers permanent tubs or boxes for the purpose of salting or preserving meat, said tubs being of a far greater durability and of a lesser cost than any barrels or boxes generally used for same purpose; also to use said tubs for preserving fresh meat, butter, lard, or other things with or without ice.

To enable others skilled in the art to make and use my invention, I will proceed to describe its construction and operation.

I put my tubs or boxes in a stone or brick-walled cellar in the following way: I put up one, two, or more partitions, A A, of stone or brick, of three feet six inches high along the walls of the cellar, at a distance of two feet two inches (or about) from the wall, and divide the space by similar cross-partitions B B, thus forming cases or tubs or boxes of two feet two inches by two feet two inches by three feet six inches, said tubs having floor C, made of brick or stone also, being eight or twelve inches thick. The material used for cellar walls, partitions of the tubs, and their floor, may be stone or brick, or concrete brick, the whole laid on good cement and covered with cement all over. A frame, D, made of scantling, two by four inches, is then put on the top of the tubs, and the doors E E, made of matched boards, and opening against the wall, are attached by hinges to the frame. Right above the floor C in each tub there is a wooden block, F, laid on cement in partition, having one inch opening O for a faucet, $f$, to draw off the brine.

The operation consists in this, that the tubs are filled with brine and the meat put in and preserved. The tubs of the above description will preserve the salt meat more perfectly and for a longer time than any barrel; besides, the tubs will last for almost an indefinite time, thereby saving a good deal of expense. Fresh meat may be preserved in the tubs by filling them partially with ice; also, the tubs may be filled with butter or lard, and will preserve them well. The tubs may be used for some other similar purposes.

What I claim as my invention, and desire to secure by Letters Patent, is—

The mode of preserving salt meat, lard, butter, or other substances, by means of stone, brick, or concrete tubs, built in a stone or brick-walled cellar, substantially in the manner herein described and specified.

ENOCH DARNELL.

Witnesses:
J. B. TURCHIN,
H. C. ROVIN.